May 18, 1954     O. R. COTE     2,678,620
PROCESS AND APPARATUS FOR MAKING TANKS AND THE LIKE
Filed July 3, 1950     6 Sheets-Sheet 1

Inventor
OVILA R. COTE
By Raymond A. Paquin
Attorney

May 18, 1954  O. R. COTE  2,678,620
PROCESS AND APPARATUS FOR MAKING TANKS AND THE LIKE
Filed July 3, 1950  6 Sheets-Sheet 2

Inventor
OVILA R. COTE
By
Raymond A. Paquin
Attorney

Inventor
OVILA R. COTE

Inventor
OVILA R. COTE

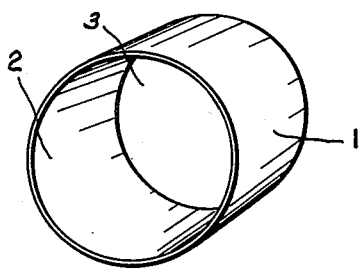
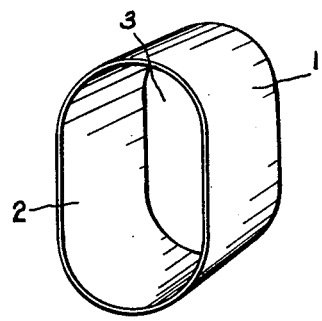
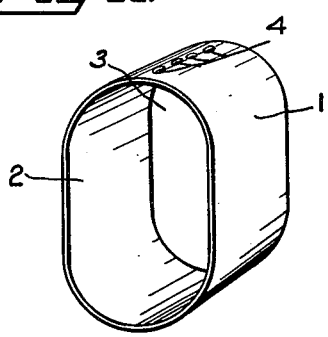
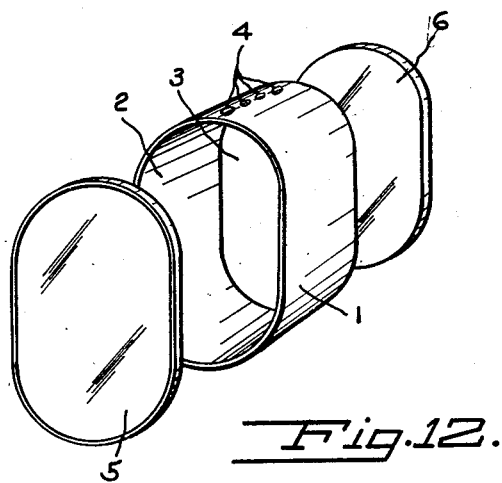
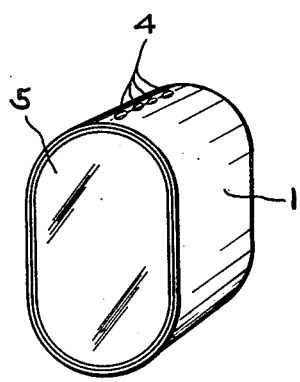

Patented May 18, 1954

2,678,620

UNITED STATES PATENT OFFICE 2,678,620

PROCESS AND APPARATUS FOR MAKING TANKS AND THE LIKE

Ovila R. Cote, Springfield, Mass.

Application July 3, 1950, Serial No. 171,881

9 Claims. (Cl. 113—1)

This invention relates to fuel storage tanks, or the like, and to a new and improved process and apparatus for making such tanks.

The principal object of the invention is to provide a new and improved process and apparatus for making tanks or the like which greatly increases the speed of production and considerably reduces the cost of production thereof and which produces a uniformly high quality product.

Another object of the invention is to provide a new and improved tank or the like which is formed by the aforesaid process and apparatus.

Another object of the invention is to provide an automatic apparatus for making tanks or the like.

Another object of the invention is to provide such a process and apparatus wherein the hand labor is substantially reduced and resulting in considerable economy of manufacturing cost.

Another object is to provide an apparatus of the type set forth which is hydraulically actuated.

Another object is to provide new and improved means and process for forming the openings in a tank during the process of manufacture thereof.

Another object is to provide new and improved process and apparatus for shaping a tank or the like.

Other objects and advantages of the invention will be apparent from the following description taken in connection with the accompanying drawings. It will be understood that changes may be made in the details of construction, arrangement of parts and steps of the process without departing from the invention as set forth in the accompanying claims as the preferred form and process have been given by way of illustration only.

Referring to the drawings:

Fig. 6 is a view taken on line 6—6 of Fig. 1, looking in the direction of the arrows;

Fig. 7 is a view taken on line 7—7 of Fig. 6, looking in the direction of the arrows;

Figs. 9 to 13 inclusive are perspective views showing the various steps in the process.

Figure 1:
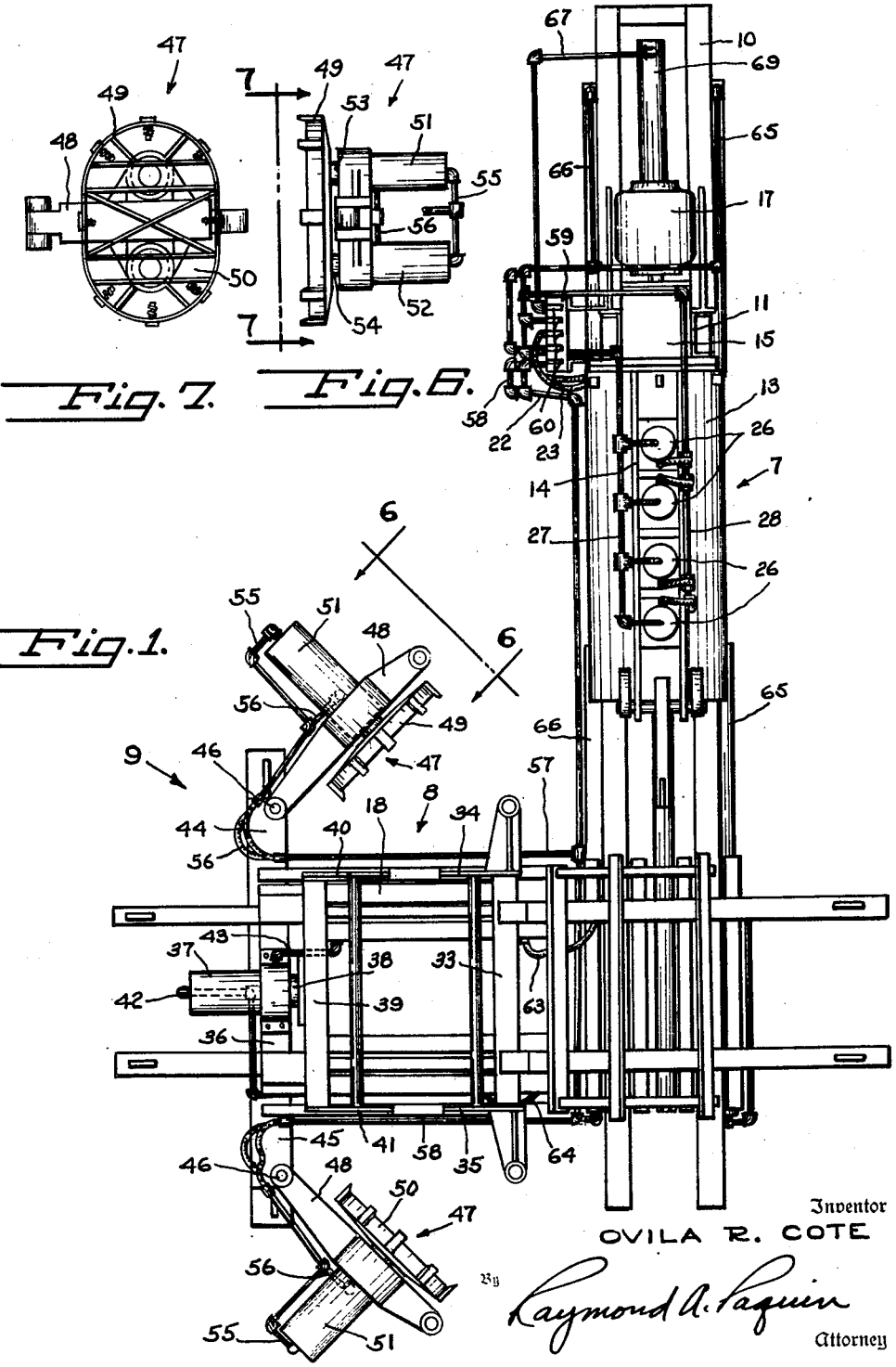
Fig. 1 is a top or plan view of a form of apparatus constructed according to my invention.
Figure 2:
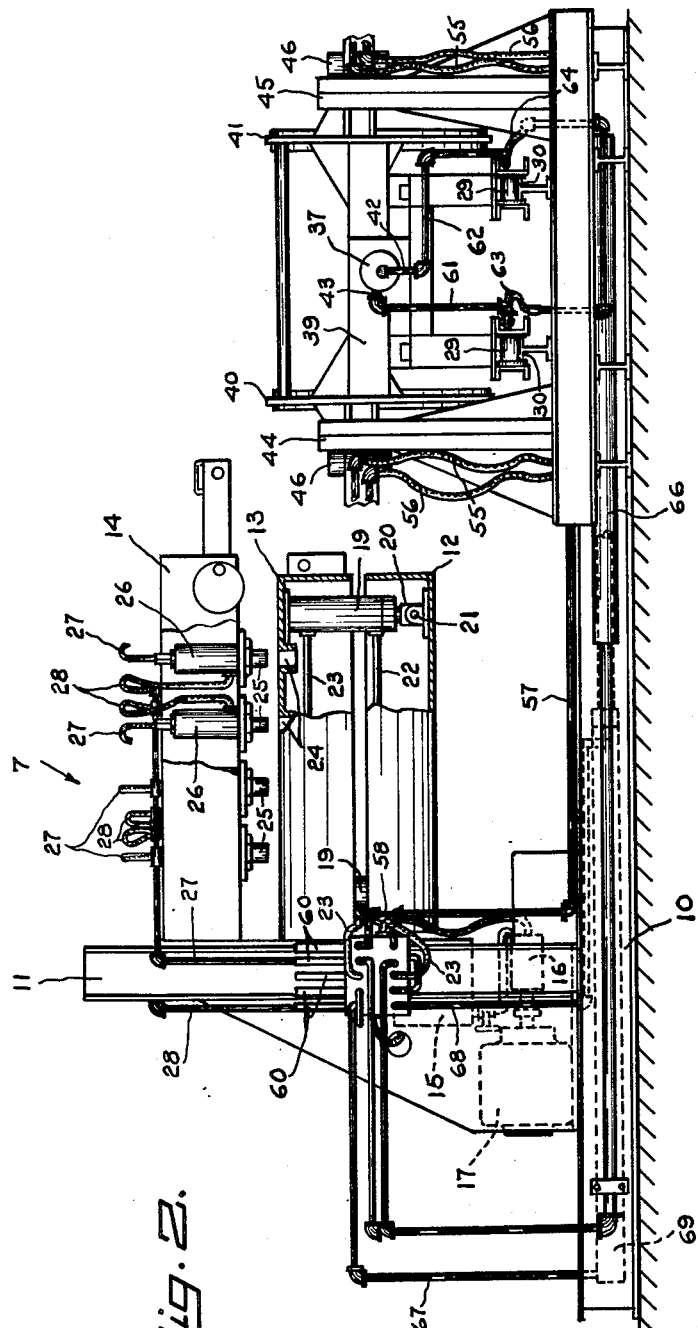
Fig. 2 is a side view thereof.

Referring more particularly to the drawings wherein similar reference characters designate corresponding parts throughout, the process of the invention, as illustrated in Figs. 9 to 13 inclusive comprises first forming a substantially cylindrical blank 1, having the opposed open ends 2 and 3, as shown in Fig. 9, by joining the ends of a sheet of flat steel or other suitable metal by suitable process, as by welding.

The blank is then pulled by the expanding mandrel of the machine, which will be described below, into the shape shown in Fig. 10. The blank will not retain this shape unless restrained as the process does not contemplate stretching the blank. While the blank is held in the shape of Fig. 10 by the machine, holes 4 as seen in Fig. 11 are punched or cut in the blank. Making these holes at this time assures their accurate placing in the completed tank. The blank is then removed from the part of the machine in which it has been shaped and in which the holes are made, by means of a clamp that restrains the blank in its formed shape, and the blank is transported without permitting it to change the shape to a station where the ends or heads 5, 6 are forced into the ends of the blank and are welded in place to complete the tank. Once the heads are welded in place the tank is completed and the clamp may be released without any danger of the blank changing shape.

The apparatus used in carrying out the method described above is shown in Figs. 1 to 8 inclusive, comprises three sections, first, the shaping section designated generally at 7, second, the blank support and transfer section designated generally at 8 and third, the end attaching section designated generally at 9.

The shaping section 7 comprises a base 10 comprising a pair of spaced members on which are carried the upright support 11 which in turn carries the pair of relatively movable shaping expanding mandrels or jaws 12 and 13 and support arm 14 for the cutting or stamping tools or dies as hereinafter described.

The apparatus shown is hydraulically operated and hydraulic power is provided by fluid from fluid supply tank 15 which fluid is forced under pressure through hydraulic lines by hydraulic pump or fluid motor 16 which is driven by electric motor 17.

Support 11 is fixed on base 10 and blank supporting section 8 is mounted on carriage 18 adapted to be moved relative to shaping section 7 and end attaching section 9.

Shaping section 7 includes the relatively movable mandrel members 12 and 13 as previously described. These movable mandrel members are of the contour that it is desired to impart to the upper and lower portions of the tank. The body portion between the upper and lower portions being generally parallel and substantially flat.

Within or between the mandrel members are spaced hydraulic cylinders 19 with pistons and piston rams 20 mounted therein, secured to the lower stationary mandrel 12 at 21. Cylinders 19 are double acting for positive expanding and contracting action. In the upper surface of jaw 13 are openings 24 which are located beneath cutting tools or dies 25 which are carried by support arm 14 and these tools or dies 25 are each carried by double acting pistons within cylinders 26 and each of which are adapted to receive fluid through lines 27 and 28 respectively depending on the direction of movement of tools 25.

The movement of the mandrels 12 and 13 away from each other causes blank 1 to be formed to desired shape and size depending upon the size of the blank and contour of jaws 13 and 14.

Carriage 18 comprises a pair of tracks or slides 36, on which is mounted blank supporting section 8 which is mounted on rollers or the like 29 which are movable on slides 30 which in turn are mounted on rollers 31 which are movable on slides 32 on base 10 whereby said carriage 18 may be moved in two directions at right angles to each other and whereby the carriage 18 may be moved into position beneath mandrel 12 to enclose and grasp the blank 1 and then by means of said slides 30 and 32 as previously described, said carriage may be moved into position relative to end attaching section 9.

Carriage 18 is provided with upright supports 33 and 36. On supports 33 is supported the spaced fixed clamps 34 and 35. On the side of carriage 18 opposite fixed clamps 34 and 35 is upright support 36 on which is carried hydraulic double acting cylinder 37 in which is positioned piston or ram 38 on the free end of which is carried movable support 39 which is provided adjacent its opposite ends with a pair of clamps 40 and 41 similar to but oppositely disposed to clamps 34 and 35. Piston 38 is actuated in cylinder 37 by hudraulic fluid provided through lines 42 and 43.

The inner contour of the two pairs of clamps 34 and 35, and 40 and 41 is such as to enclose the blank 1 therebetween in the shape which has been given such blank by mandrels 12 and 13 and such clamps retain said blank in such shape during its transfer from the shaping section 7 to the end attaching section 9 and retain said blank in position relative to said end attaching section while said ends are positioned within the opposite ends of blank 1 after which said ends are secured in such position by welding or the like to both secure said ends in such position and form tight seals between said blank 1 and said ends 5 and 6.

End attaching section 9 comprises a pair of upright supports 44 and 45, one adapted to be adjacent each end of blank 1 and on each of these supports is pivotally mounted at 46 an end supporting and installing device 47 comprising a supporting frame 48 having movable supports 49 adapted to support a preformed end section. End supporting and installing devices 47 are adapted to be actuated by a pair of rams 53 and 54 by which they are carried and which rams are secured to double acting pistons in cylinders 51 and 52. Said cylinders and pistons are adapted to be actuated by hydraulic fluid through lines 55 and 56 which are connected to the adjacent ends of both cylinders whereby the pair of pistons in each of cylinders are actuated simultaneously as a unit. The number of cylinders 51 and 52 and pistons 53 and 54 can be one or more as desired and depending on the size of the tank and sections, but I have found that by employing two cylinders for each end section that a satisfactory working construction can be obtained.

The pivots 46 allow the supports 48 to be pivoted into and out of operative position and while this is desirable such supports could be fixed rather than pivoted if desired.

The mechanism is preferably hydraulically actuated, as stated above, and the lines 55 and 56 for supplying fluid to the cylinders 51 and 52 are connected to the pipe lines 57 and 58 respectively which are connected to control valve 59 which is provided with control levers 60 for controlling said valve 59.

Hydraulic lines 42 and 43 are provided for actuating the two way cylinder 37 and piston or ram 38 and said lines are connected to pipe lines 61 and 62 by means of flexible lines 63 and 64 respectively which are connected to telescoping pipe lines 65 and 66 respectively whereby said carriage 18 may be moved longitudinally or transversely to upright 11 and jaws 12 and 13 but said piston and cylinder 38 and 37 will be connected to said control valve 59 at all times.

The hydraulic lines 67 and 68 are provided for supplying fluid to cylinder 69 for moving carriage 18 towards or away from support 11.

Figure 3:
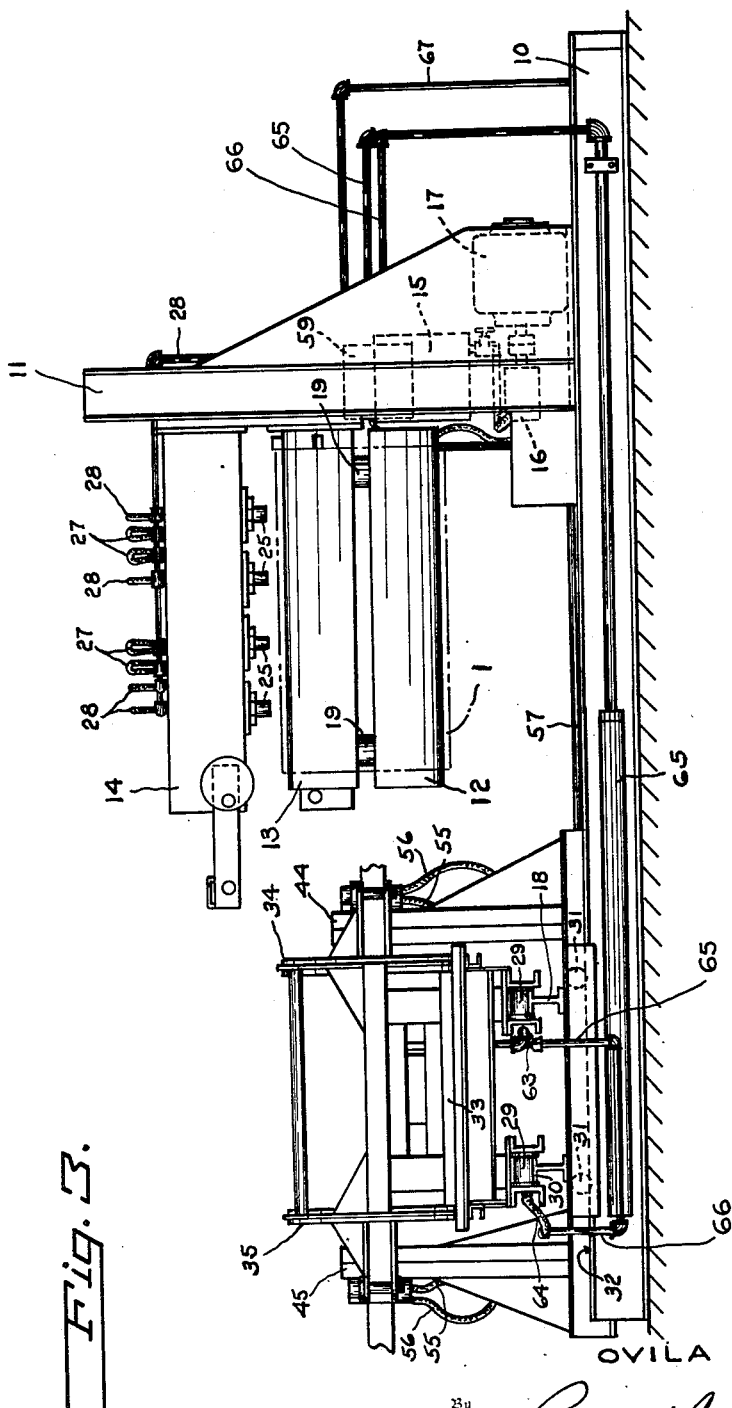
Fig. 3 is a side view showing the opposite side thereof.
Figure 4:
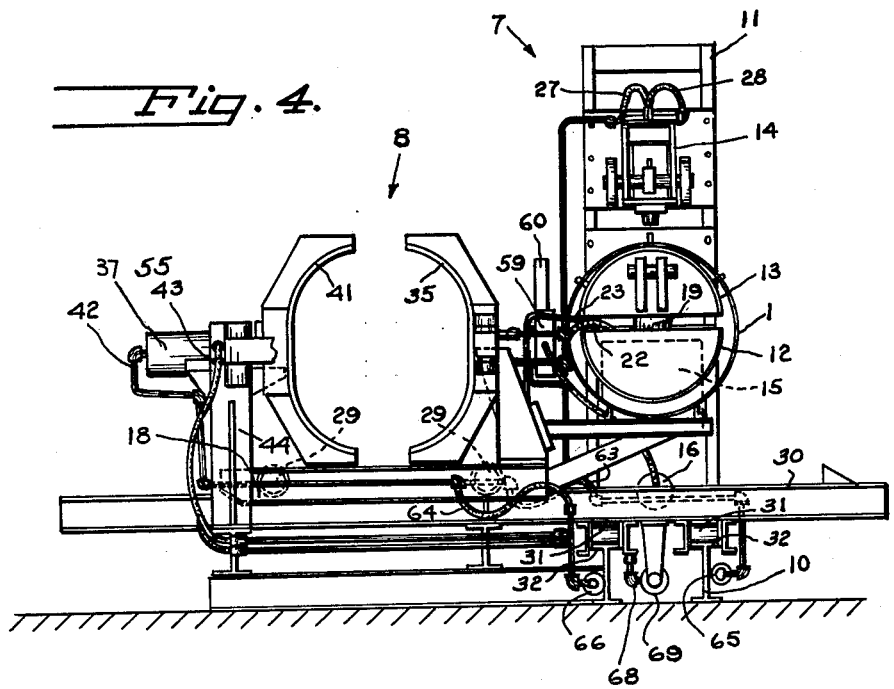
Fig. 4 is an end view thereof.
Figure 5:
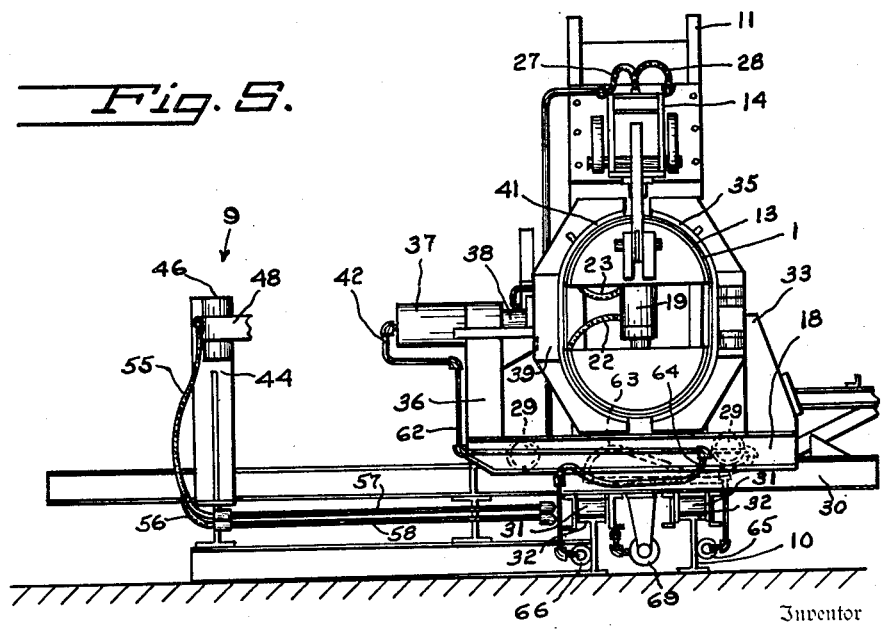
Fig. 5 is an end view generally similar to Fig. 4 but showing the supporting frame in position on the formed blank.
Figure 8:
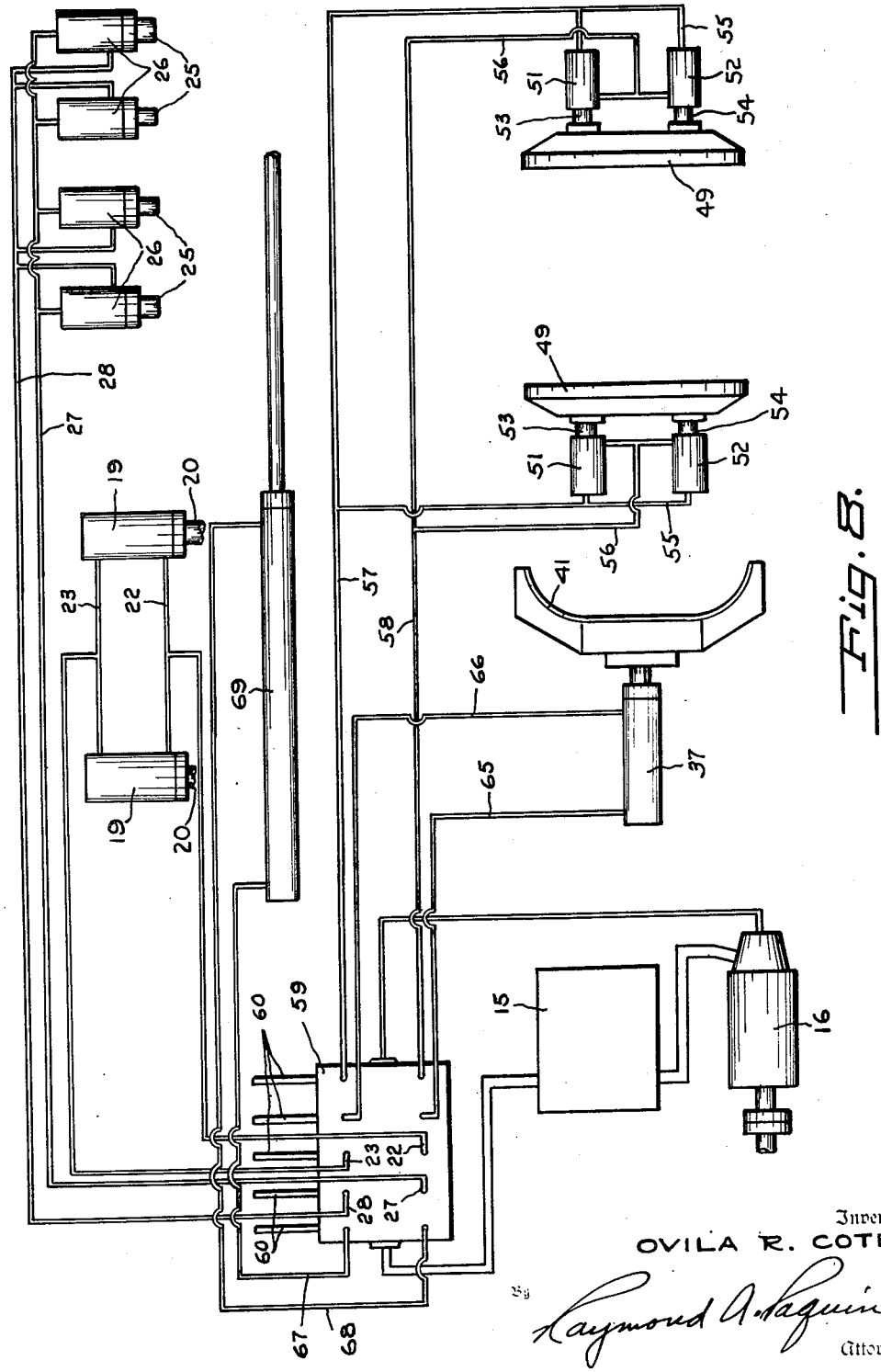
Fig. 8 is a schematic view showing diagrammatically the hydraulic system employed for actuating the apparatus.

In carrying out the process of the invention a blank 1 is formed by joining, such as by welding, the opposite ends of a sheet of suitable material such as steel, or the blank 1 can be formed by any other suitable process, and said blank 1 is then placed in position over mandrels 12 and 13 as shown in Figs. 4 and 5 in full lines and in dotted lines in Fig. 3. Cylinders 19 are then actuated to separate mandrels 12 and 13 to form blank 1 into desired shape for the finished article as shown in Figs. 10 to 13 inclusive and Fig. 5.

Clamping jaws or carriage 18 are then positioned over blank 1 and cylinder 37 actuated to position clamping jaws 34 and 35 over blank 1 and mandrels 12 and 13 retracted and carriage 18 is then moved by means of rollers 31 to move the carriage out from under the mandrels and by rollers 29 to move the carriage to position said carriage between pairs of end positioning cylinders 51 and 52 and supports 49 and 50, each of which supports one of the preformed ends 5 and 6 and then pairs of cylinders 51 and 52 energized to force ends 5 and 6 into the opposite ends of blank 1 and the adjacent edges between each of ends 5 and 6 and blank 1 are welded to retain said ends in position and seal the joining edges to make the tank liquid tight.

With the apparatus of this invention one operator can be positioning the ends in one tank while another operator is placing a new blank over the forming mandrels 12 and 13 which allows practically continuous production of tanks on the apparatus of this invention, thus greatly speeding up production and greatly reducing the unit cost and practically eliminating expensive hand labor.

It is pointed out that the apparatus instead of being hydraulically operated could be mechanically operated if desired. Also that the process of this application, as set forth above, could be carried out with apparatus other than as shown and described herein.

From the foregoing it will be seen that I have provided relatively simple and economical process and apparatus for carrying out all of the objects of my invention.

Having described my invention, I claim:

1. The process of making a tank or the like comprising, forming a blank having a continuous wall and open ends, shaping said blank to an oval shape desired in the finished tank by placing said blank on a form having a pair of relatively movable mandrel sections and effecting relative movement of said mandrel sections, forming openings in the wall of said blank while retaining said blank in said desired oval shape, removing said blank from said movable mandrel sections while retaining by external means the oval contour of said blank imparted by said mandrel sections, forming end sections having a contour of the shape and size of the openings in the opposite ends of the shaped blank, and securing one of said end sections in each of the opposed ends of said blank while retaining said blank in said desired shape by said external means.

2. The process of making a tank or the like comprising, forming a blank having a substantially cylindrical wall and open ends, placing said blank on at least two relatively movable jaws to shape said blank to the contour desired in the finished tank, separating said jaws to pull said blank into oval shape, placing a support comprising relatively movable clamping members over the wall of said blank while said blank is on said jaws to retain the same in such oval shape, removing said blank from said jaws while said blank is retained in oval shape by said clamping members, positioning and securing formed oval end portions in each of the open ends of said blank while said blank is supported by said clamping members in said oval shape, and releasing said clamping members from the completed tank.

3. An apparatus for making tanks or the like comprising, a pair of relatively movable mandrel elements adapted to be positioned within a substantially cylindrical blank having open ends, means for effecting relative movement of said mandrel elements to shape said blank to a predetermined shape, retaining means comprising relatively movable clamping members for engaging the external surface of said blank for retaining said blank in said predetermined shape while said blank is being removed from said mandrel, track means for said retaining means whereby said retaining means and blank may be moved away from said jaws, and supporting means actuable for positioning preformed ends in each of the open ends of said blank while said blank is supported by said clamping members on said track.

4. An apparatus for making tanks or the like comprising, a pair of relatively movable mandrel elements adapted to be positioned within a substantially cylindrical blank having open ends, hydraulic means for effecting relative movement of said mandrel elements to shape said blank to a predetermined shape, hydraulically actuated retaining means comprising relatively movable clamping members adapted to clamp said blank for engaging the external surface of said blank and retaining said blank in said predetermined shape while said blank is being removed from said mandrel elements, track means for said retaining means whereby said retaining means and blank may be moved away from said mandrel elements, and supporting means actuable for positioning preformed ends in each of the open ends of said blank while said blank is supported by said clamping members on said track.

5. An apparatus for making tanks or the like comprising, a pair of relatively movable mandrel elements adapted to be positioned within a substantially cylindrical blank having open ends, means for effecting relative movement of said mandrel elements to shape said blank to a predetermined shape, means for forming openings in said blank while said blank is retained in said predetermined shape on said mandrel elements, retaining means comprising relatively movable clamping members adapted to clamp said blank for retaining said blank in said shape while said blank is being removed from said mandrel elements, track means for said retaining means whereby said retaining means and blank may be moved away from said mandrel elements, and supporting means actuable for positioning preformed ends in each of the open ends of said blank while said blank is supported by said clamping members on said track.

6. The process of making a tank of generally oval section and with accurately located openings in the wall thereof comprising forming a blank of roughly cylindrical section by welding together the ends of a rectangular sheet of metal, pulling the cylinder into oval section by relative movement of internal mandrel means, forming openings in the wall of said blank while retaining said blank in oval shape by said internal mandrel means, removing said blank from said internal supports while retaining said blank in its oval section by clamping means engaging the outer surface of said blank, positioning and welding preformed oval heads to said blank as it is thus held in oval section to complete the tank, and releasing the clamping means from the completed tank.

7. The process of making a tank of generally oval section and with accurately located openings in the wall thereof comprising forming a blank of roughly cylindrical section by welding together the ends of a rectangular sheet of metal, pulling the cylinder into oval section by relative movement of internal mandrel means, removing said blank from said internal supports while retaining said blank in its oval section by clamping means engaging the outer surface of said blank, positioning and welding preformed oval heads to said blank as it is thus held in oval section to complete the tank, and releasing the clamping means from the completed tank.

8. The apparatus of claim 3 in which one of said mandrel means is provided with apertures to act as dies to cooperate with punches aligned with said apertures, whereby openings may be punched in said blank while said blank is being manipulated to form a tank.

9. The apparatus of claim 3 in which the retaining means is on wheels positioned on tracks whereby the retaining means and blank are movable as a unit and the blank may be removed from the mandrel elements while retained in said predetermined shape and positioned adjacent said supporting means for positioning the preformed ends in the open ends of the blank.

References Cited in the file of this patent

UNITED STATES PATENTS

| Number | Name | Date |
|---|---|---|
| 756,832 | Cleveland | Apr. 12, 1904 |
| 2,187,431 | Powell | Jan. 16, 1940 |
| 2,384,324 | Martin | Sept. 4, 1945 |